United States Patent
Werlein et al.

[15] 3,699,231
[45] Oct. 17, 1972

[54] METHOD FOR INHIBITING THE GROWTH OF BACTERIA USING A SYNERGISTIC MIXTURE OF SODIUM DIMETHYLDITHIOCARBAMATE AND FORMALDEHYDE

[72] Inventors: Eugene R. Werlein; John W. Hollingsworth; Lyndon D. Pinson, all of Harris County, Tex.

[73] Assignee: Dresser Industries, Inc., Dallas, Tex.

[22] Filed: July 11, 1969

[21] Appl. No.: 841,129

[52] U.S. Cl...................................424/286, 424/334
[51] Int. Cl..........A01n 9/02, A01n 9/12, A01n 9/24
[58] Field of Search..............424/286, 333, 334, 342

[56] References Cited

UNITED STATES PATENTS

| | | | |
|---|---|---|---|
| 2,504,404 | 4/1950 | Flenner | 167/22 |
| 3,173,832 | 3/1965 | Harris | 167/22 |
| 3,198,699 | 8/1965 | Boogaart | 167/22 |
| 3,223,513 | 12/1965 | Geary | 71/2.3 |

OTHER PUBLICATIONS

Chem. Abst., Murata et al., Vol. 61, 1964 p. 1193d.

*Primary Examiner*—Albert T. Meyers
*Assistant Examiner*—Allen J. Robinson
*Attorney*—Robert W. Mayer, Daniel Rubin, Raymond T. Majesko, Roy L. Van Winkle, William E. Johnson, Jr. and Roderick W. MacDonald

[57] ABSTRACT

A method for inhibiting microbial growth in substances and a biocidal composition therefor employing a synergistic mixture of sodium dimethyldithiocarbamate and formaldehyde.

1 Claim, No Drawings

METHOD FOR INHIBITING THE GROWTH OF BACTERIA USING A SYNERGISTIC MIXTURE OF SODIUM DIMETHYLDITHIOCARBAMATE AND FORMALDEHYDE

BACKGROUND OF THE INVENTION

It is desirable to have a biocide which can be incorporated in substances be they solid, liquid, or gases, and which will have the effect of inhibiting microbial growth in those substances since it is a well known fact that microbial flora can cause substantial corrosion damage when contacted with conventional apparatus such as iron containing pipes, vats, and the like, and can themselves create objectionable odors.

In addition, in substances suitable for special uses such as drilling fluids, solutions used in the paper making industry, and the like, microbial flora can materially alter the physical characteristics of the substance containing the flora. For example, deterioration in fluid loss control and/or viscosity control in a drilling fluid can occur due to microbial action. Drilling fluids which are especially susceptible to microbial degradation are those which contain organic materials suitable as food for the microbes, e.g., those containing starch, polymer, and the like. The term "drilling fluids" used herein is meant to include drilling muds (water base or hydrocarbon, e.g., oil base) used for drilling in, completing, or working over wells, for packer fluids, and the like.

SUMMARY OF THE INVENTION

According to this invention there is provided a biocidal composition which is composed of a mixture of at least one aldehyde as hereinafter defined and at least one carbamate as hereinafter defined.

Also according to this invention there is provided a method for inhibiting microbial growth in a substance wherein there is incorporated in the substance an effective microbial growth inhibiting amount of the biocidal composition of this invention.

The method and composition of this invention is applicable to a wide variety of solid liquid and gaseous substances so long as the biocidal composition can be incorporated in the substance and the substance is substantially chemically inert to the biocidal activity of the biocidal composition. Thus, the biocidal composition and method of this invention are useful in the above-mentioned drilling fluids, the paper making industry, paints, cutting oils or fluids, and any other system requiring microbial inhibition with which they are compatible.

Accordingly, it is an object of this invention to provide a new and improved biocidal composition. It is another object to provide a new and improved method for inhibiting microbial growth in substances. It is another object to provide a biocidal composition and method for inhibiting microbial growth particularly adaptable to drilling fluids as presently used in drilling wells.

Other aspects, objects, and advantages of the invention will be apparent to those skilled in the art from the disclosure and the appended claims.

DETAILED DESCRIPTION OF THE INVENTION

According to this invention the biocidal composition is composed of (1) at least one aldehyde selected from the group consisting of paraformaldehyde of the formula $HO(CH_2O)_xH$ where $x$ varies from 2 to 5,000, preferably 2 to 100, inclusive, and aldehydes represented by the formula

where R is one of hydrogen, alkyl having from one to 10, preferably from one to five, inclusive, carbon atoms per molecule, cycloalkyl having from four to 10, preferably six to eight, inclusive, carbon atoms per molecule, and aromatic having from six to 14, inclusive, carbon atoms per molecule; and (z) at least one carbamate of the formula

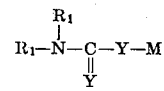

where R1 is defined in the same manner as R hereinabove for the aldehydes, Y is one of oxygen and sulfur, preferably sulfur, and M is one of an alkali metal and an alkaline earth metal, preferably zinc, sodium, potassium, rubidium, lithium, calcium, and magnesium.

Suitable aldehydes include formaldehyde, acetaldehyde, n-butyraldehyde, iso-butyraldehyde, cyclobutylaldhyde, cyclohexylaldehyde, cyclooctylaldehyde, cyclodecylaldehyde, benzaldehyde, and the like.

Suitable carbamates include dimethyldithiocarbamates, dimethylcarbamates, diethylcarbamates, octyldecylcarbamates, cyclohexylcarbamates, cyclononylcarbamates, benzylcarbamates, and napthylcarbamates of one of zinc, sodium, potassium, calcium, magnesium, or the like.

The aldehyde and carbamate components of the composition of this invention are combined in a weight ratio range of the aldehyde to the carbamate of from about 0.1/1 to about 1/0.1, preferably from about 0.5/1 to about 1/0.5.

The composition can be prepared in any conventional manner such as by mixing the components together under ambient conditions of temperature, pressure, and atmosphere, although superambient or subambient pressures and temperatures can be employed as well as inert atmospheres so long as the biocidal activity of the resulting composition is substantially unaffected.

The resulting biocidal composition is then incorporated into the substance to be protected in an effective microbial growth inhibiting amount. The incorporation can also be carried out in any conventional manner but will generally be intimately mixing the biocidal composition with the substance to be treated such as high shear or gentle mixing under conditions set forth hereinabove for the mixing of the biocidal composition components themselves. When the substance to be treated is a solid it can be inoculated with the biocidal composition or coated therewith such as by subdividing the solid and coating the particles with the biocidal composition by mixing. The ultimate desired result is the intimate and homogeneous mixing of the biocidal composition and the substance so that microbial flora in all parts of the substance are likely to contact a portion of the biocidal composition.

The amount of biocidal composition incorporated in a particular substance will vary widely depending upon the substance itself, the biocidal composition itself, the conditions of use of the substance, the extent of prior contamination of the substance by microbes, the time period of growth inhibition desired, and the like. Thus, it is substantially impossible to quantitatively state a general minimum effective amount of the biocidal composition. There is no maximum amount from a biocidal point of view although large excesses of the biocidal composition may not be desirably used because of economic considerations. However, generally at least about 5 parts per million of the biocidal composition can be employed based on the total parts of the substance to be treated.

The biocidal composition and method of this invention is applicable to microbes in general and particularly to sulfate reducing microbes. However, this invention is generally applicable to aerobic and anaerobic bacteria. Examples of sulfate-reducing bacteria to which this invention is applicable include Division: Protophyta

| Class:Schizomycetes | Class:Same |
|---|---|
| Order: Pseudomonadales | Order: Eubacterialles |
| Sub-Order: Pseudomonadineae | Family: Bacillaceae |
| Family:Spirillaceae | Genus:Clostridium |
| Genus:Desulfovibrio | Species:Nigrificans and |
| Species  1. Desulfuricans | perhaps others |
| 2. Estuarie | |
| 3. Rubentschikii | |
| 4. Thermodesulfuricans | |

EXAMPLE

A sample substance for treatment was formed by intimately mixing at ambient conditions of temperature and pressure and under ambient air atmosphere, 315 milliliters of sea water, 94 grams of bentonite, 6 grams of a mixture of chrome lignite and chrome lignosulfonate in a 1 lignite to 2 lignosulfonate weight ratio, 2 milliliters of a 50 per cent aqueous solution of sodium hydroxide, and 35 milliliters of Diesel oil.

Seventy gram portions of this sample substance were taken for each test. Each 70 gram portion was contaminated with equal amounts of a mixed culture of micro-organisms containing both aerobic and anaerobic bacteria and particularly containing sulfate-reducing bacteria. Each sample was treated with an additive of formaldehyde in a 40 weight per cent water solution, sodium dimethyldithiocarbamate, or a combination of the 40 weight per cent solution of formaldehdye and sodium dimethyldithiocarbamate in a 1/1 weight ratio. One sample was left untreated by formaldehyde or carbamate or a combination thereof. This blank was tested along with the other test samples to make sure that microbial growth would have taken effect. In each instance the blank showed substantial microbial growth. Various concentrations of each of the additives was employed to obtain the minimum concentration of each material necessary to prevent growth of bacteria in the sample after a 15 minute period, after a 24 hour period, and after a 7 day period following treatment of the sample.

Two media were employed to determine bacterial growth subsequent to treatment of the samples with various additives to inhibit microbial growth. The first media was a standard, commercial preparation, nutrient agar, Baltimore Biological Laboratory, Baltimore, Md. The second media was the recommended media for cultivation of sulfate-reducing bacteria as set forth in Recommended Practice number 38(1958), American Petroleum Institute, and was composed of 1 gram of magnesium sulfate, 1 gram of potassium biphosphate, 0.1 gram of ammonium sulfate, 0.1 gram of sodium sulfite, 0.1 gram of ascorbic acid, 3.5 milliliters of sodium lactate, 1 gram peptone, 1 gram yeast extract, 3 grams agar, and 1,000 milliliters distilled water. After each sample had been treated with the additive and the treated sample allowed to sit under ambient conditions for its designated period of time of 15 minutes, 24 hours, or 7 days, sub-samples of approximately 0.1 cc were drawn out of each sample with a sterilized pipette, mixed with liquified nutrient agar medium held at 35° C., then poured into a sterile petri dish and allowed to solidify prior to incubation. A second 0.1 cc sub-sample was removed from the treated sample and mixed with the sterile, liquified API media in a 13 × 150 mm, screw-top test tube, being held at 35° C. To prevent solidification, and then allowed to solidify at room temperature prior to incubation. All tests were done in duplicate with a blank untreated sample included in the series. The nutrient agar samples were incubated for 36 hours at 32° C. and API samples were incubated 1 week to 10 days at 32° C. After incubation, each sample was examined for microbial presence therein.

Each additive was checked at 50 to 3,000 ppm, based on active ingredient of the additive, in increments of 50 ppm, to determine the minimum concentration of the additive necessary to substantially completely inhibit microbial growth over a period of 7 days. The results of this program were as follows:

TABLE I

| Additive | Concentration in ppm necessary to prevent any microbial growth for 7 days |
|---|---|
| 1) Formaldehyde | 1750 |
| 2) Sodium dimethyldithiocarbamate | greater than 3000 |
| 3) Mixture of 1) and 2) | 1250 |

It can be seen from the above table that it took 1,750 ppm of formaldehyde by itself to prevent microbial growth for the 7 day period.

The sodium dimethyldithiocarbamate, when used by itself, did not prevent microbial growth over the 7 day period even after 3,000 ppm of that additive had been employed. Thus, the minimum amount of sodium dimethyldithiocarbamate necessary was greater than 3,000 ppm and most likely substantially greater than 3,000 ppm because even after employing 3,000 ppm substantial microbial growth was evident in the medium after the 7 day test period.

It can further be seen from the table that when a 1/1 weight ratio of the formaldehyde and sodium dimethyldithiocarbamate were combined to form a biocidal composition which was then added to a sample, the combination of these two materials was very substantially more effective as a biocide than either of the two materials taken alone. This is evidenced by the fact that with only 1250 ppm of the combination of formaldehyde and sodium dimethyldithiocarbamate microbial growth was prevented for the 7 day period.

Thus, the combination of the aldehyde and carbamate gave biocidal results better than the predictable additive results from the use of the two components by themselves.

Reasonable variations and modifications are possible within the scope of this disclosure without departing from the spirit and scope of this invention.

The embodiments of the invention in which an exclusive property or privilege is claimed are defined as follows:

1. A method for inhibiting growth of sulfate reducing bacteria comprising applying to said bacteria an antibacterially effective amount of a composition consisting essentially of formaldehyde and sodium dimethyldithiocarbamate in a 1/1 weight ratio.

* * * * *